(12) United States Patent
Dorschu et al.

(10) Patent No.: US 9,821,536 B2
(45) Date of Patent: Nov. 21, 2017

(54) TRANSPARENT ANTIBALLISTIC ARTICLE AND METHOD FOR ITS PREPARATION

(71) Applicant: DSM IP ASSETS B.V., Heerlen (NL)

(72) Inventors: Marko Dorschu, Echt (NL); Alexander Antonius Marie Stroeks, Echt (NL); Hao Chen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/438,036

(22) PCT Filed: Oct. 29, 2013

(86) PCT No.: PCT/EP2013/072612
§ 371 (c)(1),
(2) Date: Apr. 23, 2015

(87) PCT Pub. No.: WO2014/067947
PCT Pub. Date: May 8, 2014

(65) Prior Publication Data
US 2015/0251392 A1    Sep. 10, 2015

(30) Foreign Application Priority Data
Oct. 30, 2012    (EP) .................................... 12190579

(51) Int. Cl.
| | |
|---|---|
| *F41H 5/02* | (2006.01) |
| *B32B 27/08* | (2006.01) |
| *F41H 5/04* | (2006.01) |
| *B32B 27/32* | (2006.01) |
| *B32B 27/34* | (2006.01) |
| *B32B 27/36* | (2006.01) |
| *B32B 37/18* | (2006.01) |
| *B32B 7/12* | (2006.01) |
| *B32B 37/06* | (2006.01) |
| *B32B 7/00* | (2006.01) |
| *B32B 7/02* | (2006.01) |
| *B32B 27/28* | (2006.01) |
| *B32B 27/30* | (2006.01) |

(52) U.S. Cl.
CPC .............. *B32B 27/08* (2013.01); *B32B 7/005* (2013.01); *B32B 7/02* (2013.01); *B32B 7/12* (2013.01); *B32B 27/28* (2013.01); *B32B 27/288* (2013.01); *B32B 27/306* (2013.01); *B32B 27/32* (2013.01); *B32B 27/34* (2013.01); *B32B 27/36* (2013.01); *B32B 37/06* (2013.01); *B32B 37/182* (2013.01); *F41H 5/04* (2013.01); *F41H 5/0407* (2013.01); *B32B 2250/24* (2013.01); *B32B 2250/42* (2013.01); *B32B 2270/00* (2013.01); *B32B 2307/40* (2013.01); *B32B 2307/516* (2013.01); *B32B 2307/54* (2013.01); *B32B 2307/56* (2013.01); *B32B 2307/702* (2013.01); *B32B 2307/704* (2013.01); *B32B 2309/02* (2013.01); *B32B 2309/12* (2013.01); *B32B 2377/00* (2013.01); *B32B 2571/02* (2013.01)

(58) Field of Classification Search
CPC ..... B32B 27/08; B32B 27/288; B32B 27/306; B32B 27/32; B32B 27/34; B32B 27/36; B32B 27/06; B32B 27/182; B32B 7/005; B32B 7/02; B32B 7/12; B32B 37/06; B32B 37/182; F41H 5/04; F41H 5/0407
USPC ........................................................ 89/36.02
See application file for complete search history.

(56) References Cited

U.S. PATENT DOCUMENTS

| | | | | |
|---|---|---|---|---|
| 5,354,605 A | * | 10/1994 | Lin ....................... | F41H 5/0485 428/105 |
| 5,804,015 A | * | 9/1998 | McCarter .............. | B29C 59/046 156/209 |

FOREIGN PATENT DOCUMENTS

| | | | | |
|---|---|---|---|---|
| NL | WO 2010066819 A2 | * | 6/2010 | ............... B32B 7/02 |
| WO | WO2008133703 A2 | * | 10/2007 | |
| WO | WO 2008/133703 | | 11/2008 | |
| WO | WO 2008133703 A2 | * | 11/2008 | ........... B29C 43/003 |

(Continued)

OTHER PUBLICATIONS

International Search Report for PCT/EP2013/072612 dated Nov. 22, 2013, 4 pages.

(Continued)

*Primary Examiner* — Samir Abdosh
(74) *Attorney, Agent, or Firm* — Nixon & Vanderhye P.C.

(57) ABSTRACT

This invention relates to a process for the preparation of an antiballistic article, the method comprising: a) Providing a transparent uniaxially stretched polymeric film with at least one layer I comprising a semi-crystalline thermoplastic polymer A and at least one layer II comprising an amorphous or semi-crystalline thermoplastic polymer B, of which polymer B has a glass transition temperature less than the melting temperature of polymer A if polymer B is amorphous or of which polymer B has a melting temperature less than the melting temperature of polymer A if polymer B is semi-crystalline; b) Stacking at least two of the uniaxially stretched polymeric films of a) at an angle a of between 45° and 135°, such that the films are in contact with each subsequent film through at least one layer II, to form an assembly; c) Compressing the thus formed assembly at a temperature above the glass transition temperature of polymer B if polymer B is amorphous, or above the melting temperature of polymer B if polymer B is semi-crystalline, and below the melting temperature of polymer A, to obtain an haze of at most 50% and having an energy absorption for 17 grain FSP according to the STANAG 2920 standard of at least 12 J/(kg/m$^2$). The invention also relates to antiballistic articles.

16 Claims, No Drawings

(56) References Cited

FOREIGN PATENT DOCUMENTS

WO    WO 2010/066819    6/2010
WO    WO2010066819 A2 *    6/2010

OTHER PUBLICATIONS

Written Opinion of the International Searching Authority for PCT/EP2013/072612 dated Nov. 22, 2013, 7 pages.

* cited by examiner

TRANSPARENT ANTIBALLISTIC ARTICLE AND METHOD FOR ITS PREPARATION

This application is the U.S. national phase of International Application No. PCT/EP2013/072612 filed 29 Oct. 2013, which designated the U.S. and claims priority to EP Patent Application No. 12190579.8 filed 30 Oct. 2012, the entire contents of each of which are hereby incorporated by reference.

The invention relates to a method for the preparation of a transparent antiballistic article and to a transparent antiballistic resistant article.

Transparent antiballistic articles are designed to be optically transparent, yet protect from fragmentation or ballistic impact. Examples include transparent armor window and visors, which not only need to defeat the designated threat but also to provide a multi-hit capability with minimized mechanical and visual distortions.

Attempts have been made to provide articles with both antiballistic as well as transparent properties, such as described in WO2010/066819. This patent describes antiballistic articles and a method for its preparation in which a plurality of anisotropic polymeric films are stacked together and subsequently consolidated with a pressure of at least 80 MPa at a temperature below the melting temperature of the polymer. The examples of WO2010/066819 focus on antiballistic articles made from anisotropic ultrahigh molecular weight polyethylene films. A disadvantage of the method as disclosed in WO2010/066819 is that it requires high pressures to ensure consolidation of the various layers, moreover the optical transparency is still too low.

WO2008/133703 describes bonded polymeric film laminates which are suitable for ballistic protection. The document discloses transparent materials, but is silent about the level of transparency. Moreover, the antiballistic performance is still not sufficient.

It is thus an object of the present invention to provide a method for preparation of an antiballistic article, with improved optical transparency and improved antiballistic performance, as well as a antiballistic articles made by this kind of method.

This has been achieved by a method for the preparation of an antiballistic article, the method comprising:
a) Providing a transparent uniaxially stretched polymeric film with at least one layer I comprising a semi-crystalline thermoplastic polymer A and at least one layer II comprising an amorphous or semi-crystalline thermoplastic polymer B, of which polymer B has a glass transition temperature less than the melting temperature of polymer A if polymer B is amorphous or of which polymer B has a melting temperature less than the melting temperature of polymer A I if polymer B is semi-crystalline;
b) Stacking at least two of the uniaxially stretched polymeric films of a) at an angle α of between 45° and 135°, such that the films are in contact with each subsequent film through at least one layer II, to form an assembly;
c) Compressing the thus formed assembly at a temperature above the glass transition temperature of polymer B if polymer B is amorphous, or above the melting temperature of polymer B if polymer B is semi-crystalline, and below the melting temperature of polymer A,
to obtain an haze of at most 50% and having an energy absorption for 17 grain FSP according to the STANAG 2920 standard of at least 12 J/(kg/m$^2$).

The method according to the invention provides for an antiballistic article, which can be prepared using a low amount of pressure, while maintaining a low haze. This allows applications in which good visibility together with high impact resistance is desired, such as a wide variety of products, such as body armors and helmets, goggles, protective shields, ballistic proof windows use in building and military, VIP and value transport vehicles.

The uniaxially stretched polymeric film provided in step a) is substantially transparent, preferably having a haze of at most 10%, and more preferably having a haze of at most 5%, as otherwise the required haze of at most 50% will not be attained.

Layer I

Layer I may be made of any semi-crystalline thermoplastic polymer hereafter denoted as polymer A. Polymer A may be chosen from the group consisting of polyolefins- such as polypropylene-, polyesters, polyvinyl alcohols, polyacrylonitriles, polyamides or polyketone. Suitable polyamides are, for example, the aliphatic polyamides PA-6, PA-66, PA-9, PA-11, PA-46, PA-410 and copolyamides thereof, such as PA-6/66 or PA-66/6. Semi-aromatic polyamides are also suitable, such as based on for example PA-6 or PA-66 and aromatic dicarboxylic acids and aliphatic diamines, for example isophthalic acid and terephthalic acid and hexanediamine, for example PA-4T, PA-6/6T, PA-6IPDT, PA-66/6,T, PA-66/6/6T and PA-66/6I/6T. Preferably PA-6, PA-66 and PA-46 are chosen. Furthermore, also polyamide blends are suitable. The nomenclature is adhered to as used in Nylon Plastics Handbook, Edited by Melvin I. Kohan, Hanser Publishers, 1995.

Suitable thermoplastic polyesters are, for example, poly(alkylene terephthalate)s, like polybutyleneterephthalate (PBT), polytrimethyleneterephthalate (PTT), polyethyleneterephthalate (PET), polycyclohexanedimethyleneterephthalate (PCT), and poly(alkylene naphthanate)s, like polyethylenenaphthanate (PEN), and copolymers and mixtures.

The thickness of layer I can in principle by selected from a wide range. Preferably however, the maximum thickness after stretching of a layer I does not exceed 150 micrometer (μm), more preferably does not exceed 80 μm, even more preferably does not exceed 50 μm and most preferably does not exceed 30 μm. For practical reasons such thickness will preferably be at least 5 μm, more preferably at least 10 μm. Multiple layers I may be present in the stretched film provided for in step a).

Layer II

The uniaxially stretched polymeric film provided for in step a) has at least one layer I and at least one layer II. The polymer of layer II is thermoplastic. The polymer of layer II is amorphous or semi-crystalline and denoted as polymer B. Polymer B has a glass transition temperature less than the melting temperature of polymer A if polymer B is amorphous, or polymer B has a melting temperature less than the melting temperature of polymer A if polymer B is semi-crystalline. Preferably, the difference between the glass transition temperature of polymer B and the melting temperature of polymer A is at least 15° C., more preferably at least 20° C., and most preferred at least 30° C., if polymer B is amorphous. If polymer B is semi-crystalline, the difference between the melting temperature of polymer A and the melting temperature of polymer B is preferably at least 15° C., more preferably at least 20° C., and most preferred at least 30° C. The advantage of having a larger difference between these temperature is that a more transparent article can be obtained.

Melting temperatures and glass transition temperatures of polymers can be determined by a calorimetric technique according to ASTM 11357-3 and ASTM 3418-3 respectively.

Preferably the uniaxially stretched polymeric film has a total of 3 layers, namely two layers II and at least one layer I, whereby the layers II are opposite of layer I, thus forming the surface layers of the stretched polymeric film, as this facilitates adhesion.

In another embodiment the stretched polymeric film provided for in step a) has a plurality of layers I, each divided by a layer II, and in which the surfaces are formed of layer II. This allows for less stacking steps in step b) of the method.

Preferably, the weight ratio of layer I versus layer II is at least 70:30, more preferably 80:20, even more preferred 90:10. The higher the weight ratio, the better the antiballistic performance of the assembly.

Layer I and layer II can be combined by a multilayer film cast extrusion process or by a lamination process, which is explained below. For multilayer film cast extrusion, layer II can be chosen from any thermoplastic polymer B. Suitable materials for polymer B include polyolefins—such as polypropylene, polyethylene and ethylene-propylene copolymers and functionalized versions of the before mentioned polyolefins, such as maleic anhydride grafted polyolefins. Also suitable materials for polymer B are polyesters, polyvinyl alcohols, polyacrylonitriles, polyamides or polyketone. Suitable polyamides are, for example, the aliphatic polyamides PA-6, PA-66, PA-9, PA-11, PA-46, PA-410 and copolyamides thereof and semi-aromatic polyamides based on for example PA-6 or PA-66 and aromatic dicarboxylic acids and aliphatic diamines, for example isophthalic acid (I) and terephthalic acid (T) and hexanediamine, for example PA-4T, PA-6/6T, PA6I/6T, PA-66/6T, PA-66/6/6T and PA-66/6T. Furthermore, also polyamide blends are suitable.

Preferably polymer B is a semi-aromatic copolyamide, such as PA6I/6T, PA-66/6,T, PA-66/6/6T and PA-66/6I/6T.

Suitable thermoplastic polyesters are, for example, poly (alkylene terephthalate)s, like polybutyleneterephthalate (PBT), polytrimethyleneterephthalate (PTT), polyethyleneterephthalate (PET), polycyclohexanedimethyleneterephthalate (PCT), and poly(alkylene naphthanate)s, like polyethylenenaphthanate (PEN), and copolymers and mixtures.

In case layer I and layer II are combined with a lamination process, polymer B can be chosen from laminating adhesives, such as waterborn and solvent based laminating adhesives or hot melts. Examples of waterborn or solvent based adhesives are based on polyurethanes, acrylic emulsions, polyvinylalcohol or ethylene vinylacetate copolymers, acrylic or natural rubbers. Examples of hot melt adhesives are ethylene vinyl acetate, modified polyolefins or polyesters.

Preferably, if there are two layers II acting as surface layers, then these are made from the same material, as this allows for the strongest adhesion after compression in step c).

The thickness of layer II can in principle be selected from a wide range. Preferably however, the thickness is less than the thickness of layer I, such as 5 to 10% with respect to the total film. Generally the thickness is at least 1 micrometre, to allow sufficient adhesion.

Most preferred uniaxially stretched polymeric film has a total of 3 layers, namely two layers II with polymer B being semi-aromatic copolyamide and at least one layer I with polymer A being polyamide-6, whereby the layers II are opposite of layer I, thus forming the surface layers of the stretched polymeric film, as this facilitates adhesion and provides the best optical properties.

Uniaxial

In the case of multilayer film cast extrusion as described above, the polymeric film with at least one layer I and at least one layer II, is stretched at a temperature between the glass transition temperature ($T_g$) and the melting temperature ($T_m$) of polymer A to provide a uniaxially stretched polymeric film in step a) of the process according to the invention.

By uniaxially stretching is meant in the context of the present application that two mutually perpendicular directions can be defined in the plane of the film for which the modulus of elasticity in a first direction is at least 2 times higher than the modulus of elasticity in the direction perpendicular to it. Generally said first direction of the stretched film is in the art also referred to as machine direction or drawing direction (or as direction of orientation) having the highest mechanical properties.

The strength of the uniaxially stretched polymeric film largely depends on the polymer from which they are produced, and on the stretch ratio. For polyamides including copolyamides, the tensile strength of one stretched polymeric film is preferably at least 0.2 GPa, as measured in its strongest direction, more preferably at least 0.4 GPa and most preferred at least 0.75 GPa.

In case layer I and layer II are combined with a lamination process, the above stretching processes are applied for a film of layer I only, after which the lamination process is carried out. Layer I is thus first stretched and subsequently combined in a lamination process with at least one layer II. This can be performed by wet -or dry laminating processes and with the types of adhesives, acting as layer II as indicated before. An overview of lamination processes can be found in the following reference: *Laminating Adhesives for Flexible Packaging* by Edward M. Petrie, Omnexus. Preferably, the uniaxially stretched layer I is combined in a lamination process with two layers II, which act as surface layers, thus opposite of layer I, to facilitate adhesion in step c).

Examples of stretching processes are continuous planar stretching processes. Typically in these planar processes, a polymer melt leaving a rectangular slit is quenched to a film in the glassy phase on e.g. a cold metal chill role to prevent crystallization of the material as much as possible. Downstream in the process the film material is heated to above $T_g$ of polymer A, for example to a temperature in the range between 60 to 130° C. for polyamide 6, and at these temperatures the film is uniaxially stretched in-plane.

For the uniaxial stretching processes, additional subsequent uniaxial stretching steps can be applied at higher temperatures than the first stretching step but still below the melting temperature of polymer A. Each subsequent step is performed at higher temperatures. These subsequent stretching steps are performed to further increase the level of uniaxial degree of stretching.

Preferably, the uniaxially stretched polymeric film is prepared by multilayer film cast extrusion process and subsequently stretched, as this allows the film to be prepared in one step, instead of the laminating process in which first a film of at least layer I has to be prepared and subsequently stretched after which the film can be laminated.

Angle α

In step b) of the method according to the invention, at least two uniaxially stretched polymeric films are stacked at an angle α of between 45° and 135° to form an assembly. More preferably angle α lies between 65° and 115° and most preferably between 80° and 100°. In the latter preferred range a particularly preferred angle α is about 90°, since an antiballistic article is then obtained having an optimum combination of antiballistic properties and transparency. An assembly in which the direction of orientation of two subsequent stacked films differs by an angle α=90° is denoted in the art as a cross-ply.

The uniaxially stretched films in step b) are stacked such that the films are in contact with each subsequent film through at least one layer II. Preferably, the films are in contact with each subsequent film through two layers II, as this enhances the adhesion between the various uniaxially stretched films during compression in step c).

Number of Stacked Films

The assembly according to the invention comprises a plurality of stacked films, depending on the desired thickness of the assembly, as well as the thickness of the individual uniaxially stretched film. The more films are stacked, the better the anti-ballistic performance will be.

Increasing the thickness of layer I of the uniaxially stretched film in the assembly of the invention simplifies the manufacture of articles from these assemblies, for instance antiballistic plates and is also beneficial for optical properties as less scattering of light takes place.

Articles for which the optical transparency is between 50-10% haze are in the context of the present invention referred to as optically translucent, by which is meant that light passes through the article but images are blurred due to serious light scattering. Articles with a haze between 50% to 10% can be advantageously employed in applications such as impact protective shields, ballistic proof windows use in building and military, VIP and value transport vehicles, as these do not require a high degree of transparency.

Articles for which the haze is less than 10% are considered to be transparent. Preferably the articles according to the invention have a haze of at most 10%, more preferably at most 8% and even more preferred at most 5%, as this allows applications in which high transparency is required such as body armors and helmets, goggles, protective shields, ballistic proof windows use in building and military, VIP and value transport vehicles.

An antiballistic article produced by the method of the invention provides the desired combination of transparency and antiballistic performance. The level of transparency achievable is surprising since the produced article comprises a plurality of uniaxially stretched polymeric film layers that define a plurality of interfaces in between the layers. Since light is easily scattered at these interfaces, one would expect a reduced transparency against a monolithic article.

Step C)

The assembly formed in step b is compressed in step c) at a temperature above the glass transition temperature of polymer B if polymer B is amorphous, or above the melting temperature of polymer B if polymer B is semi-crystalline, and below the melting temperature of polymer A. This results in good adherence of the films, as well as high anti-ballistic properties and good transparency. Surprisingly, even with low amounts of pressure, the assembly is easily compressed. Preferably the pressure is less than 100 Bar, more preferably the pressure is less than 80 Bar, more preferred the pressure is less than 50 Bar. The pressure may be at least 5 Bar in order to ensure good adhesion of the films. The advantage of these pressures is that smaller presses can be used as compared to the process as disclosed in WO2010/066819.

The optimum time for compressing generally ranges from 5 to 120 minutes, depending on conditions such as temperature, pressure and part thickness and can be verified through routine experimentation. Preferably, in order to obtain high antiballistic performance, cooling after compression moulding at high temperature is carried out under pressure as well. Pressure is preferably maintained at least until the temperature is sufficiently low to prevent relaxation of the polymer. Typically such temperature is at most 80° C.

In a further preferred embodiment of the method of the invention, a vacuum is applied to the assembly before, during or after compressing said assembly. Preferably such vacuum is applied before or during compressing. Such vacuum may suitably be applied through a vacuum chamber or through the use of a vacuum bag. This measure has proven to be beneficial in increasing optical transparency of the produced article, but surprisingly also in increasing the antiballistic performance of the article. The applied vacuum preferably reduces the environmental pressure with at least 0.05 MPa, more preferably with at least 0.08 MPa, even more preferably with at least 0.09 and most preferably with at least 0.095 MPa.

Preferably compression is performed in a mold as this prevents leakage of the surface layer during compression. Moreover, by employing a mold, various shapes can be manufactured. Preferably, the mold has a smooth surface as this is beneficial for the optical properties of the assembly. The smooth surface can for example be obtained by applying a polymeric film with a melting temperature higher than the melting temperature of polymer A at the surfaces between the assembly and the mold as a barrier between the assembly and the surface of the mold.

In one embodiment during step c) intermediate assemblies are formed which can further be stacked to form a thicker assembly by essentially repeating step c). For example, first intermediate assemblies with a thickness of less than 3 mm are prepared by steps a) to c) and these assemblies are subsequently subjected to a further compressing step in which pressure is applied at a temperature above the glass transition temperature of polymer B if polymer B is amorphous, or above the melting temperature of polymer B if polymer B is semi-crystalline, and below the melting temperature of polymer A until a final assembly is prepared with the desired thickness. This has the advantage that handling of assemblies with a thickness of less than 3 mm is more convenient over individual stretched films and requires less stacking for the manufacturing of the final assembly as only the intermediate assemblies have to be stacked instead of the individual stretched films.

Antiballistic Articles

The method according to the invention is particularly useful in manufacturing antiballistic articles, such as armoured plates, visors, antiballistic windows, which are also transparent. In the context of this invention an antiballistic article is an article that withstands impact of a projectile travelling at a speed of at least 25 m/s, more preferably at least 50 m/s and more preferably at least 100 m/s. Antiballistic applications comprise applications with ballistic threat against projectiles of several kinds including against armor piercing, so-called AP bullets and hard particles such as e.g. fragments and shrapnel.

The invention also relates to such a transparent antiballistic article. The antiballistic article having a haze of at most 10% and having an energy absorption for 17 grain FSP according to the STANAG 2920 standard of at least 12 J/(kg/m$^2$), is obtainable by a method comprising:

a) Providing a transparent uniaxially stretched polymeric film with at least one layer I comprising a semi-crystalline thermoplastic polymer A and at least one layer II comprising an amorphous or semi-crystalline thermoplastic polymer B, of which polymer B has a glass transition temperature less than the melting temperature of polymer A if polymer B is amorphous or of which polymer B has a melting temperature less than the melting temperature of polymer A I if polymer B is semi-crystalline;

b) Stacking at least two of the uniaxially stretched polymeric films of a) at an angle α of between 45° and 135°, such that the films are in contact with each subsequent film through at least one layer II, to form an assembly;

c) Compressing the thus formed assembly at a temperature above the glass transition temperature of polymer B if polymer B is amorphous, or above the melting temperature of polymer B if polymer B is semi-crystalline, and below the melting temperature of polymer A at a pressure of at most 100 Bar.

According to the invention such an antiballistic article has an energy absorption for 17 grain fragment simulating projectiles (FSP) according to the STANAG 2920 standard of at least 12 J/(kg/m2) and an optical transparency of at most 10% haze, preferably of at most 8% transmission, even more preferred at most 7% haze. Most preferred the antiballistic article has an energy absorption for 17 grain fragment simulating projectiles (FSP) according to the STANAG 2920 standard of at least 15 J/(kg/m2) and a haze of at most 7%.

EXAMPLES

Example 1

This example deals with a three layer polyamide film consisting of one layer I of polymer A being PA6/6T, which is a PA6 based copolymer with 10%6T, and two layers II on both sides consisting of polymer B being PA6/66 with 20% 66. This film was produced by multilayer film cast extrusion process. A single screw extruder (screw diameter 30 mm, L/D=30) and a single screw extruder (screw diameter 25 mm, L/D=25) were connected to a feed block with a slot die with adjustable die-lip. The 30 mm extruder was fed with layer I material; barrel temperature set to 260° C., throughput 12 kg/h., screw speed 120 rpm. The 25 mm extruder was fed with layer II material; barrel temperature 230° C., throughput 1.0 kg/h, screw speed 100 rpm. Standard transport screws were used. The die-width was 300 mm and the die-width was 0.8 mm. The film was cooled on a chill role. The thickness of the film was regulated by the drawdown ratio and for this example was 123 μm. The chill role temperature was 23° C. and to obtain good contact between melt and chill role air pinning was applied. The film was in line trimmed to a width of 75 mm. During experimentation, measures were taken to prevent moisture uptake of the films as much as possible.

The cast film was uniaxially stretched. The stretching process occurred by leading the film over various metal roller sets. The film entered the roller set with an initial speed of 3 m/min and was heated by the rolls to 80° C. A first stretching step was performed by variation of the speed of uptake rolls. The maximum degree of stretching in this first stretching step was 3.0. A second stretching step was performed at 180° C. The maximum degree of stretching in this step was 2.7. The haze of the film after the second stretching step was 7%. After the second stretching step the film was heat set by leading the film over a role at 180° C.

Based on this film, ballistic objects were made out of many polymeric stretched films that were stacked with an angle α of 90° (cross plied). Several film materials were stacked in a 70×70 mm mold and consolidated. To prevent air inclusion between the individual layers, the stacked objects were packed in a seal bag made of similar material and brought to vacuum conditions. Compression was performed at 191° C. at a pressure of 10 bar (equivalent to 1 MPa=1.000 kN/m2) applied by a parallel plate press. Good adhesion was observed. After compression, the layers could not be separated by hand.

Example 2

This example deals with a three layer polyamide film consisting of one layer I of polymer A being PA6/6T, which is a PA6 based copolymer with 10% 6T, and two layers II on both sides consisting of polymer B being PA6I/6T with 66% 6T, an amorphous polyamide. This film was produced by multilayer film cast extrusion process. A single screw extruder (screw diameter 30 mm, L/D=30) and a single screw extruder (screw diameter 25 mm, L/D=25) were connected to a feed block with a slot die with adjustable die-lip. The 30 mm extruder was fed with layer I material; barrel temperature set to 260° C., throughput 12 kg/h., screw speed 120 rpm. The 25 mm extruder was fed with layer II material; barrel temperature 230° C., throughput 1.0 kg/h, screw speed 100 rpm. Standard transport screws were used. The die-width was 300 mm and the die-width was 0.8 mm. The film was cooled on a chill role. The thickness of the film was regulated by the drawdown ratio and for this example was 121 μm. The chill role temperature was 23° C. and to obtain good contact between melt and chill role air pinning was applied. The film was in line trimmed to a width of 75 mm. During experimentation, measures were taken to prevent moisture uptake of the films as much as possible.

The cast film was uniaxially stretched. The stretching process occurred by leading the film over various metal roller sets. The film entered the roller set with an initial speed of 3 m/min and was heated by the rolls to 80° C. A first stretching step was performed by variation of the speed of uptake rolls. The maximum degree of stretching in this first stretching step was 3.1. A second stretching step was performed at 120° C. The maximum degree of stretching in this step was 2.2. The haze of the film after the second stretching step was 4%. After the second stretching step the film was heat set by leading the film over a role at 120° C.

Based on this film, ballistic objects were made out of many polymeric stretched films that were stacked with an angle α of 90° (cross plied). Several film materials were stacked in a 70×70 mm mold and consolidate. To prevent air inclusion between the individual layers, the stacked objects were packed in a seal bag made of similar material and brought to vacuum conditions. Compression was performed at 160° C. at a pressure of 10 bar (equivalent to1 MPa=1.000 kN/m2) applied by a parallel plate press. Good adhesion was observed. After compression, the layers could not be separated by hand.

Example 3

This example deals with a three layer polyamide film consisting of a layer I of polymer A being film grade polyamide-6 with a relative solution viscosity of 3.2 as measured in formic acid of 90% at a concentration of 0.01 g/ml at 25° C. and on both sides a layer II consisting of a polymer B being copolyamide PA6/66 with 20% 66. This film was produced by a multilayer film cast process as described before. All conditions were identical to example 2 except for the barrel temperature of the 25 mm extruder for polymer B; it was set to 250° C. Film thickness was 118 μm. This film was uniaxially stretched according to the procedure of example 2. First stretching step was performed at 70° C.; and the maximum degree of stretching amounted to 3.0. A second stretching step was performed 180° C. The maximum degree of stretching in this step was 2.4. After the second stretching step the film was heat set by leading the film over a role at 180° C.

Based on this film, ballistic objects are made out of many individual polymeric stretched films that were stacked with an angle α of 90° (cross plied). Several film materials were stacked in a 70×70 mm mold and consolidate. To prevent air inclusion between the individual layers, the stacked objects were packed in a seal bag made of similar material and brought to vacuum conditions. Compression was performed at 191° C. at a pressure of 10 bar (equivalent to 1 MPa=1.000 kN/m2) applied by a parallel plate press. Good adhesion was observed. After compression, the layers could not be separated by hand.

Comparative Example 1

The transparent benchmark was obtained from Cleargard (Ballistic Polycarbonate sheet) the material consisted of two fused sheets with an individual thickness of 2.5 mm, a surface density of 5.5 kg/m$^2$, a tensile strength of 70 MPa and a E-modulus of 2 GPa.

Comparative Examples 2 and 3

UHMWPE gel film with a width of ±71 mm was received from DSM Solutech (P091012A-D01-A). The film was produced from a 10% UHMWPE (FG113) solution in decaline and uni-axial drawn with an unspecified draw ratio, a surface density of 17.8 gr/m$^2$. The thickness over the width of the film was not uniform, the edges had a thickness of 26 μm and the centre of the film was 17 μm. The maximal tensile strength was 16.2 cN/dtex and the E-modulus was 100 GPa.

Ballistic objects were made out of many individual films that were with an angle α of 90° (cross plied). Several film and yarn materials were stacked in a 70×70 mm mold and consolidated at temperature just below the melting point of 145C to keep all mechanical properties untouched and to induce a kind of fusing the individual layers together to result in a solid sheet.

To overcome air inclusion in the pressed sheets, the pressing was performed under vacuum in a vacuum chamber press. The fusing procedure for the UHMWPE materials needed high pressures (>800 bar=80 MPa=80.000 kN/m$^2$) applied by a parallel plate press to realize a more or less solid (cohesive) sheet. The by this fusing procedure obtained consolidated sheet showed a low level of adhesion between the individual layers. Pushing a sharp object in the side of the sheet resulted in delamination.

Comparative Example 4

This example deals with a single layer polyamide film consisting of a film grade PA6 with a relative viscosity of 3.2, as measured in formic acid of 90% at a concentration of 0.01g/ml at 25° C. This film was produced by a film cast process as described before. Only one extruder (30 mm) was connected to the feedblock. The extruder was operated at a barrel temperature 260° C., throughput 13 kg/h. Film thickness was 120 μm. This film was uniaxially stretched according to the procedure of example 1. First stretching step was performed at 70° C. with a maximum degree of stretching of 2.9. A second stretching step was performed 130° C. The maximum degree of stretching in this step was 1.7. After the second stretching step the film was heat set by leading the film over a role at 190° C.

This film was used to create a multistacking as described before. The fusing procedure for the PA6 uniaxial drawn material needed much higher pressures (>800 bar=80 MPa=80.000 kN/m$^2$) applied by a parallel plate press compared to examples 6 and 7 to realize a solid (cohesive) sheet. The by this fusing procedure obtained consolidated sheet exhibited a low level of adhesion between the individual layers. Pushing a sharp object in the side of the sheet resulted in delamination.

Comparative Example 5

A biaxially oriented (BOPA) film from polyamide-6 had a degree of stretching of 3×3 and was obtained from DSM Akulon. The film had a surface density of 15 gr/m$^2$ and a homogeneous thickness of 13 μm. The maximal tensile strength in the machine direction was 160 MPa, a E-modulus of 1 GPa and in the transversal direction the tensile strength was 110 MPa with a E-modulus of 1 GPa.

To overcome air inclusion in the pressed sheets, the pressing was performed under vacuum in a vacuum chamber press. The fusing procedure for BOPA needed high pressures (>800 bar=80 MPa=80.000 kN/m$^2$) applied by a parallel plate press to realize a solid (cohesive) sheet. The by this fusing procedure obtained consolidated sheet exhibited a low level of adhesion between the individual layers. Pushing a sharp object in the side of the sheet resulted in delamination.

Comparative Example 6

Biaxially oriented polypropylene film (BoPP) with a layer I of polymer A being polypropylene and as surface layers two layers II of a polymer B being a heat sealable layer, as commercially available from ExxonMobil called Bicor 30MB400. The sealable layer of the BOPP was not investigated but the technical data sheet mentioned a melting point (seal temperature) of ~130° C. Since PP has a melting point of ~160° C. the mechanical properties of the layer I material PP stayed untouched during compression at 130° C. The individual stacked films were compressed with very low pressures 10 bar (equivalent to 1 MPa=1.000 kN/m2), applied by a parallel plate press to create a solid sheet with good adhesion. After compression the layers could not be separated by hand.

Performance Testing of Articles

The articles were subjected to shooting tests performed with 17 grain FSP. The tests were performed with the aim of determining the energy absorbed (E-abs) at V50. V50 is the speed at which 50% of the projectiles will penetrate the armoured plate. The testing procedure was as follows. The first projectile was fired at the anticipated V50 speed. The actual speed was measured shortly before impact. If the projectile was stopped, a next projectile was fired at an intended speed of about 10% higher. If it perforated, the next projectile was fires at an intended speed of about 10% lower. The actual speed of impact was always measured. V50 was the average of the two highest stops and the two lowest perforations. The performance of the armour was also determined by calculating the kinetic energy of the projectile at V50 and dividing this by the areal density (AD) of the plate (E-abs).

Optical Testing of Articles

The produced articles were subject to a haze measurement according to ASTM D-1003, measured at a sample thickness of 2 mm and at a wavelength of 600 nm. In this application optical transparency is defined by haze in percentages according to the ASTM D-1003 method.

Tensile strength was measured according to ASTM D882-88, method A: 500 mm/min.

$T_g$ and $T_m$ and tensile strengths were measured of the films used in the process according to the invention and listed in Table 1.

TABLE 1

Tg and Tm and tensile strength values of the examples according to the invention

| Example | Material | $T_g$ & $T_m$ [° C.] | Tensile strength MPa |
|---|---|---|---|
| 1 | Uniaxial stretched: Polymer A PA6/6T Polymer B PA6/66 | 57 & 205 50 & 190 | MD: 507 TD: 55.6 |
| 2 | Uniaxial stretched: Polymer A PA6/6T; Polymer B PA6I/6T | 57 & 205 Tg = 127 | |
| 3 | Uniaxial stretched; Polymer A PA6 Polymer B PA6/66 | 60 & 225 50 & 190 | MD: 295 TD: 72 |

MD: machine direction, thus in strongest direction;
TD transverse direction

TABLE 2

Results

| Example | Material | Sheet consolidation pressure [Bar] | Haze [%] @ 600 nm; @2 mm thickness | Energy absorbed FSP [J/(kg/m2)] |
|---|---|---|---|---|
| 1 | Uniaxial stretched: Polymer A PA6/6T; Polymer B PA6/66 | 10 | 15 | 18 |
| 2 | Uniaxial stretched: Polymer A PA6/6T; Polymer B PA6I/6T | 10 | 4 | 15 |
| 3 | Uniaxial stretched; Polymer A PA6 Polymer B PA6/66 | 10 | 7 | 16 |
| Comparative 1 | Polycarbonate | Not applicable | 3 | 8 |
| Comparative 2 | UHMWPE Gel film; fully stretched | 800 | 55 | 50 |
| Comparative 3 | UHMWPE Gel film; partially stretched | 800 | 45 | 34 |
| Comparative 4 | Uniaxial PA6 | 800 | 8 | 15 |
| Comparative 5 | Biaxially stretched polyamide | 800 | — | 8 |
| Comparative 6 | Biaxially stretched Layer I polypropylene Layer II PE | 10 | 5 | 10 |

The results in Table 2 clearly show that with a process according to the invention antiballistic articles can be obtained with a very low haze, while have an energy absorbed FSP of at least 12 J(kg/m2). When biaxially stretched films were used, much less energy could be absorbed, which is indicative for a low ballistic performance. If the films did not comprise a layer I and a layer II, such as in comparative examples 2 to 5, it becomes clear that high pressures were needed to obtain sheet consolidation.

The invention claimed is:

1. A method for the preparation of an antiballistic article, the method comprising the steps of:
    (a) providing a transparent uniaxially stretched polymeric film with at least one layer I comprising a semi-crystalline thermoplastic polymer A and at least one layer II comprising an amorphous or semi-crystalline thermoplastic polymer B, wherein the polymer B has a glass transition temperature which is at least 15° C. less than a melting temperature of the polymer A if the polymer B is amorphous or wherein the polymer B has a melting temperature which is at least 15° C. less than the melting temperature of the polymer A if the polymer B is semi-crystalline;
    (b) stacking at least two of the uniaxially stretched polymeric films of step (a) at an angle α of between 45° and 135°, such that the films are in contact with each subsequent film through at least one layer II, to form an assembly;
    (c) compressing the thus formed assembly of step (b) at a temperature above the glass transition temperature of polymer B if polymer B is amorphous, or above the melting temperature of polymer B if polymer B is semi-crystalline, and below the melting temperature of polymer A, to obtain a haze of at most 50% and having an energy absorption for 17 grain FSP according to the STANAG 2920 standard of at least 12 J/(kg/m$^2$).

2. The method according to claim 1, wherein the haze is at most 10%.

3. The method according to claim 1, wherein the angle α is between 80° and 100°.

4. The method according to claim 1, wherein the uniaxially stretched polymeric film in step (a) has a total of 3 layers, wherein two layers II are opposite of one layer I.

5. The method according to claim 1, wherein step (b) includes contacting the films with each subsequent film through two layers II.

6. The method according to claim 4, wherein the polymer B in the two layers II is the same.

7. The method according to claim 1, wherein the polymer A is selected from the group consisting of polyamides, co-polyamides, polyesters, and polypropylene.

8. The method according to claim 1, wherein the polymer A is selected from the group consisting of aliphatic polyamides, semi-aromatic polyamides, and polyamide blends.

9. The method according to claim 1, wherein the polymer B is a co-polyamide.

10. The method according to claim 1, wherein the polymer A is polyamide-6/6T and the polymer B is a polyamide-6/66.

11. The method according to claim 1, wherein step c) is performed by compressing the assembly at a pressure less than 100 Bar.

12. The method according to claim 1, wherein step (c) is performed by compressing the assembly at a pressure less than 50 Bar.

13. The method according to claim 1, wherein the uniaxially stretched polymeric film provided in step (a) is prepared by a multilayer film cast extrusion process.

14. The method according to claim 1, wherein the polymer B has a glass transition temperature which is at least 20° C. less that the melting temperature of the polymer A if the polymer B is amorphous or wherein the polymer B has a melting temperature which is at least 20° C. less than the melting temperature of the polymer A if the polymer B is semi-crystalline.

15. The method according to claim 1, wherein the polymer B has a glass transition temperature which is at least 30° C. less that the melting temperature of the polymer A if the polymer B is amorphous or wherein the polymer B has a melting temperature which is at least 30° C. less than the melting temperature of the polymer A if the polymer B is semi-crystalline.

16. An antiballistic article obtained by the method of claim 1 having a haze of at most 10% and having an energy absorption for 17 grain FSP according to the STANAG 2920 standard of at least 12 J/(kg/m$^2$).

* * * * *